(No Model.) 2 Sheets—Sheet 1.
W. N. WHITELEY & W. BAYLEY.
HARVESTER AND BINDER.
No. 258,181. Patented May 16, 1882.
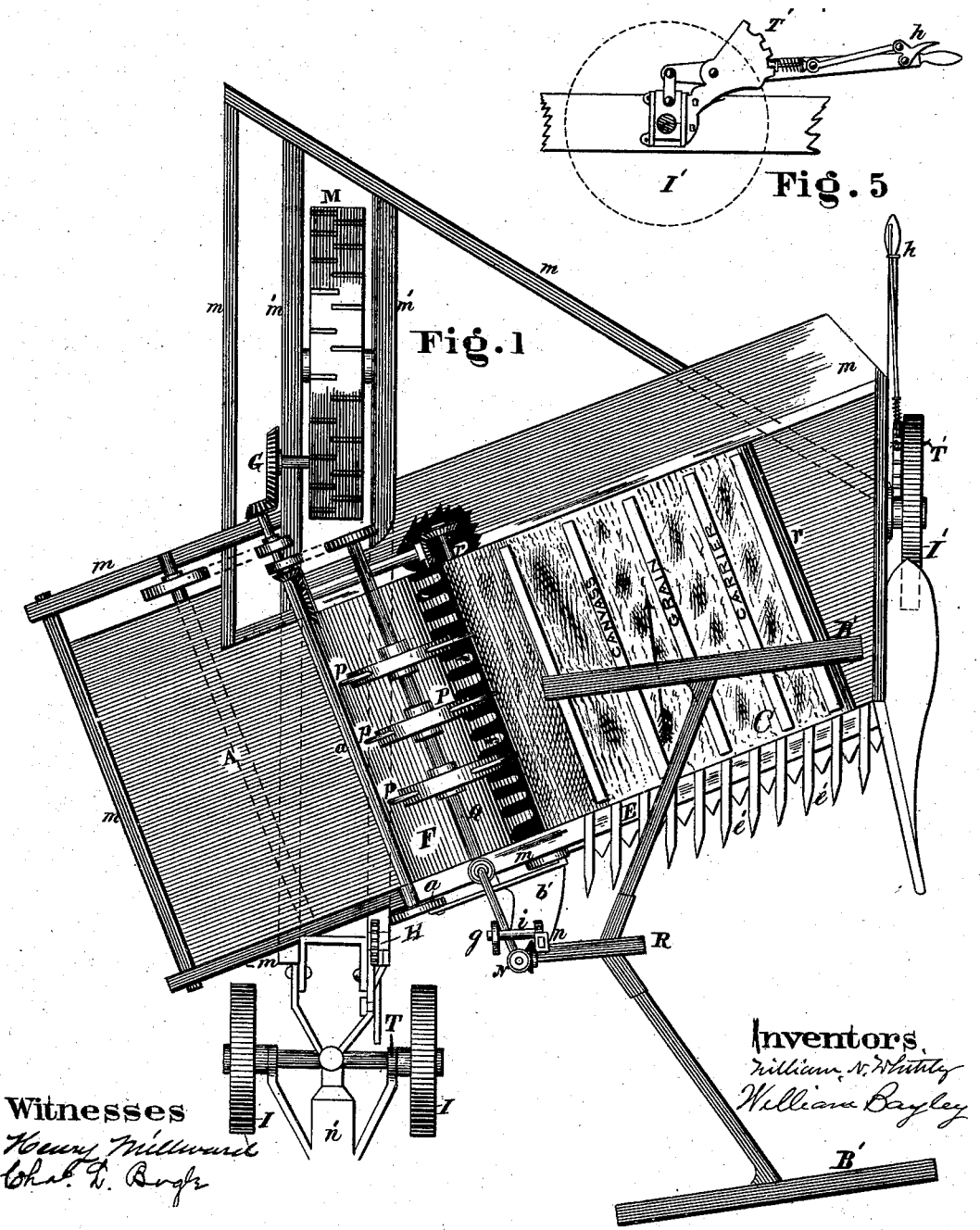
Witnesses
Henry Millward
Chas. L. Boyle
Inventors
William N. Whiteley
William Bayley (No Model.) 2 Sheets—Sheet 2.
W. N. WHITELEY & W. BAYLEY.
HARVESTER AND BINDER.
No. 258,181. Patented May 16, 1882.
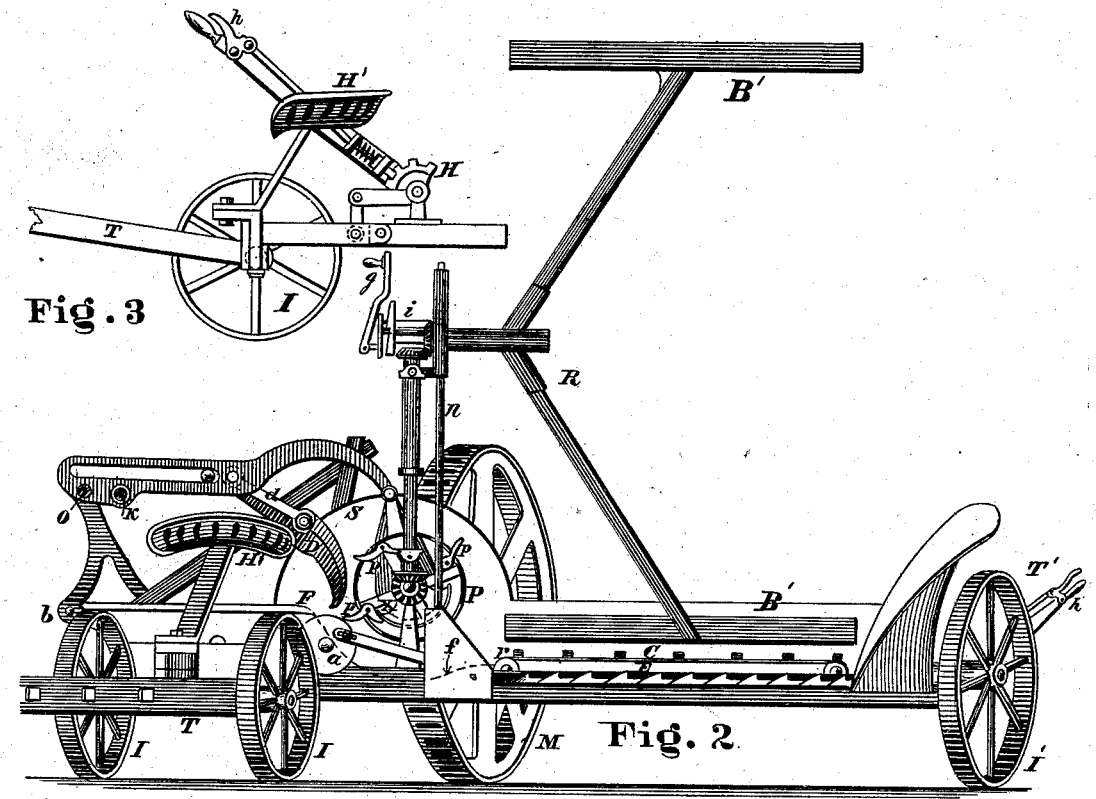
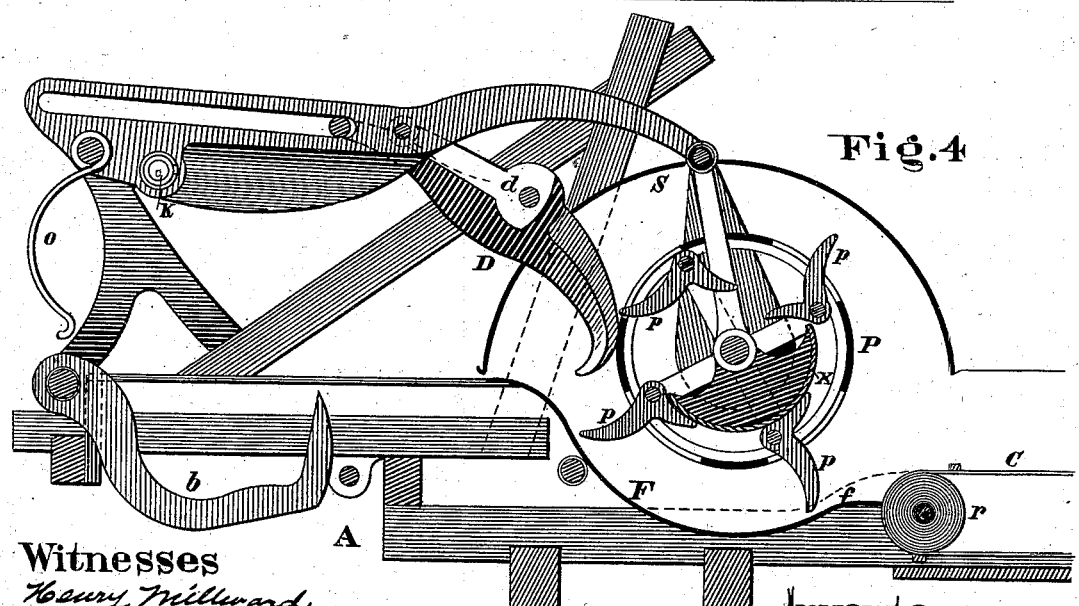

UNITED STATES PATENT OFFICE.

WILLIAM N. WHITELEY AND WILLIAM BAYLEY, OF SPRINGFIELD, OHIO, ASSIGNORS TO WHITELEY, FASSLER & KELLY, OF SAME PLACE.

HARVESTER AND BINDER.

SPECIFICATION forming part of Letters Patent No. 258,181, dated May 16, 1882.

Application filed December 13, 1880. (No model.)

*To all whom it may concern:*

Be it known that we, WILLIAM N. WHITELEY and WILLIAM BAYLEY, of Springfield, county of Clarke, State of Ohio, have invented a new and useful Improvement in Harvesters and Binders, of which the following is a specification.

Our invention relates to that class of harvesters and binders by which the harvesting is done entirely by mechanical means and the binding accomplished either by mechanical devices, by hand, or a combination of both.

In order to clearly illustrate in what our invention consists, we deem it advisable to arrange it under several heads, which preferably form a part of one complete machine, but some of which may be conveniently and advantageously applied to many harvesting or combined harvesting and binding machines now in use.

Our invention consists, first, in a machine wherein the cutting apparatus, the conveyer, binder, and reel are all set obliquely to the line of progression.

The second part of our invention consists of a combined harvesting and binding machine provided with a rear master-wheel, a vertically-adjustable forward truck, and a vertically-adjustable grain-wheel, and having said combined harvesting and binding machine mounted upon its traveling wheels obliquely to the line of progression for the purpose of a better presentation of grain from the harvesting to the binding machine.

The third part of our invention consists of a platform or frame carrying a cutting apparatus, a conveyer, a revolving reel, a grain-packer, and a binding apparatus, the whole mounted upon wheels in a suitable manner to cause the aforesaid conveyer to move in a line obliquely to the line of travel of the harvester, by which means the weight may be evenly distributed between the master-wheel and forward truck.

Letters of like character represent corresponding parts in each of the figures.

In the accompanying drawings, Figure 1 is a plan view of a machine of our invention. Fig. 2 is a longitudinal elevation of the same. Fig. 3 is a view illustrating the device for vertically adjusting the main frame at its attachment to the forward truck. Fig. 4 is an enlarged view of the grain-packer and parts of a binder, and Fig. 5 is a view illustrating the device used for vertically adjusting the platform at its attachment to the grain-wheel.

On an inspection of the drawings, it will be obvious that the location of the grain-wheel and binder-table may be reversed from left to right and from right to left without materially changing the nature of the invention.

The main frame $m$ and $m'$ is constructed in a substantial manner, and is mounted upon a master-wheel, M, a grain-wheel, I', and a forward truck, I, the master-wheel M being rigidly secured to the cross-pieces $m'$, and the truck I and grain-wheel I' so attached as to permit of a vertical adjustment of the main frame in relation to the axles upon which the wheels revolve. These adjustments are made in the usual manner by link-connections to the frame, controlled by a sector, and spring-detent operated by levers, as shown in Figs. 3 and 5 of drawings.

The rollers $r$, upon which the canvas carrier C travels, are suitably journaled in the frame $m$.

Between the carrier C and binder-table A, a rotating packer, P, having teeth $p$, is located and firmly journaled to the frame $m$, and the rake-teeth of this packer are controlled by cams X, so that they reach out as they near the carrier C and retreat as they deliver the grain to the binder-table A. These rake-teeth and cams are protected by a sheet-metal cylinder surrounding and traveling with them, this cylinder being provided with slots, through which the rake-teeth protrude when approaching the carrier C and through which they retreat when approaching the binder-table A.

Directly beneath the rotating packer is situated a sheet-metal concaved receptacle, F, over which the packer continues the travel of the grain on its way to the binder. This sheet-metal receptacle F is provided with a serrated edge, $f$, which serves as a stripper for the carrier C, and the spaces formed by serrating the edges provide spaces through which the points of the rake-teeth can pass in order to better take hold of the grain as it falls from the carrier into the receptacle F.

The cutting apparatus E is provided with fingers $e'$, attached to the usual finger-bar, so as to form an acute angle to its longitudinal edge, so as to assist in giving direction to the grain in order that it may fall obliquely upon the carrier C. The reel R is attached to the frame $m$ by means of a bracket, $b'$, and is set with its axis horizontal, but inclined backward obliquely to the line of progression of the machine, and is provided with beaters B', which are thereby caused to separate the standing grain and force the separated portion of it against the cutting apparatus and upon the carrier C in an oblique direction, in order that the heads of the grain will have farther to travel than the butts.

The cutting apparatus E, carrier C, packer P, and reel R receive motion from the master-wheel M in the usual manner, the cutting apparatus receiving motion from it by means of a pinion, bevel-gear, and pitman, the carrier by means of same pinion and bevel-gear and additional miter-gear, the packer by means of the same pinion and bevel-gear and additional chain-wheels, and the reel from the same pinion, bevel-gear, and chain-wheels and additional miter-gear.

In this application we do not claim any new feature on the binder mechanism, but simply show a few parts of a binder to better illustrate this invention.

Having described the general features of our improved machine, we will now describe its mode of operation.

The grain is presented to the cutting apparatus E by means of the fingers $e'$ and the beaters B' of reel R in a suitable manner to cause it to fall upon the carrier C in an oblique direction, as clearly illustrated by the arrow located thereon. By this means it will be observed that the heads of the grain have farther to travel than the butts have in order to be parallel with the packer-shaft Q when it is dumped into the receptacle F. This will enable the butts to gain upon the heads what they lose by contact with falling grain. The grain being properly presented to the packer P, is thereby passed to the binder-table A, where the divider-arm D of the binding apparatus takes it and delivers it to the compress O and binder-arm $b$, where the usual operation of encircling it with cord and tying the ends of the same may be proceeded with, while the shield S, forming a cover for the receptacle F, serves to retain the incoming grain in the said receptacle until the divider-arm again returns for the next sufficiently-accumulated sheaf.

Having thus described our invention, what we claim as new, and desire to secure by Letters Patent, is—

1. An endless traveling conveyer, C, moving in an oblique direction to the line of travel of the machine to which it is attached, and a cutting apparatus, E, parallel with the conveyer, and provided with fingers $e'$, that stand parallel with the line of travel of said machine and obliquely to said cutting apparatus and conveyer, in combination with a revolving reel, R, the axis whereof is set obliquely to the line of progression, as set forth, the whole arranged and constructed for the purpose of straightening the grain during its travel upon said conveyer.

2. A combined harvesting and binding machine provided with a rear master-wheel, M, a vertically-adjustable forward truck, I I, a cutting apparatus, conveyer, and automatic binder mounted between said wheel and truck, and extended laterally in a direction oblique to the line of progression, and a vertically-adjustable grain-wheel, I', for the purpose of a better presentation of grain to the binding-machine.

3. A platform, $m$, carrying a cutting apparatus, E, a conveyer, C, a packer, P, and a binding apparatus at A, the whole mounted upon wheels, and the conveyer moving in an oblique direction to the line of travel of the machine, substantially as and for the purpose specified.

In testimony whereof we have hereunto set our hands this 4th day of December, 1880.

WILLIAM N. WHITELEY.
WILLIAM BAYLEY.

Witnesses:
  HENRY MILLWARD,
  CHAS. L. BOGLE.